(12) United States Patent
Kaupp

(10) Patent No.: US 6,779,770 B2
(45) Date of Patent: Aug. 24, 2004

(54) HOLDER FOR A BEVERAGE CONTAINER

(75) Inventor: Klaus Kaupp, Waldachtal (DE)

(73) Assignee: Fischer Automotive Systems GmbH, Horb (DE)

( * ) Notice: Subject to any disclaimer, the term of this patent is extended or adjusted under 35 U.S.C. 154(b) by 0 days.

(21) Appl. No.: 10/298,363

(22) Filed: Nov. 18, 2002

(65) Prior Publication Data

US 2003/0098402 A1 May 29, 2003

(30) Foreign Application Priority Data

Nov. 28, 2001 (DE) .......................................... 101 58 373

(51) Int. Cl.[7] .................................................. A47K 1/08
(52) U.S. Cl. .................................... 248/311.2; 224/926
(58) Field of Search ............................ 248/311.2, 314, 248/310; 224/926; 297/188.14, 188.15, 188.16, 188.17, 188.19

(56) References Cited

U.S. PATENT DOCUMENTS

| | | | | |
|---|---|---|---|---|
| 4,953,771 A | * | 9/1990 | Fischer et al. .............. | 224/549 |
| 4,981,277 A | * | 1/1991 | Elwell ..................... | 248/311.2 |
| 5,024,411 A | * | 6/1991 | Elwell ..................... | 248/311.2 |
| 5,072,909 A | * | 12/1991 | Huang ...................... | 248/311.2 |
| 5,104,184 A | * | 4/1992 | Kwasnik et al. ........ | 297/188.16 |
| 5,104,185 A | * | 4/1992 | Christiansen et al. .. | 297/188.16 |
| 5,167,392 A | * | 12/1992 | Henricksen .............. | 248/311.2 |
| 5,171,061 A | * | 12/1992 | Marcusen ............... | 297/188.17 |
| 5,318,266 A | * | 6/1994 | Liu ......................... | 248/311.2 |
| 5,601,268 A | * | 2/1997 | Dunchock ................ | 248/311.2 |
| 5,671,877 A | * | 9/1997 | Yabuya ..................... | 224/282 |
| 5,897,089 A | * | 4/1999 | Lancaster et al. ........ | 248/311.2 |
| 5,988,579 A | * | 11/1999 | Moner et al. ............ | 248/311.2 |

FOREIGN PATENT DOCUMENTS

DE 199 63 202 A1 6/2001
FR 2 758 299 7/1998

OTHER PUBLICATIONS

Patent Abstracts of Japan 08207639 A, Aug. 13, 1996.

* cited by examiner

Primary Examiner—Ramon O. Ramirez
Assistant Examiner—Kofi Schulterbrandt
(74) Attorney, Agent, or Firm—Michael J. Striker

(57) ABSTRACT

A holder for a beverage container has two holding arms which engage around an insertion opening for the beverage container and are mounted so that they are pivotable in a lateral direction about pivot axes as pincers, and an adjuster provided for a size of the insertion opening and contacting the holding arms at points spaced away from the pivot axes and also keeping constant a spacing of the holding arms from one another at the contact points, the adjuster having an adjustable spacing from the pivot axes of the holding arms.

4 Claims, 4 Drawing Sheets

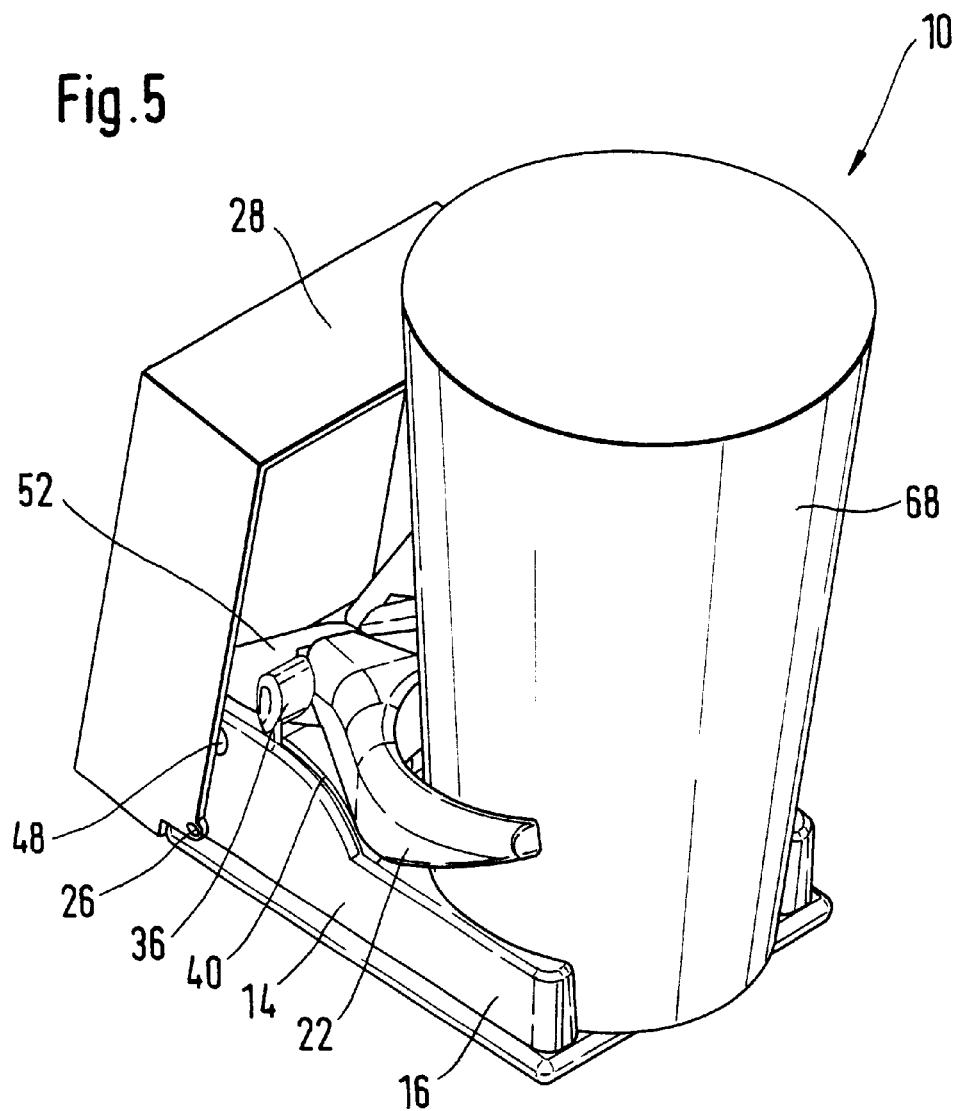

HOLDER FOR A BEVERAGE CONTAINER

BACKGROUND OF THE INVENTION

The invention relates to a holder for a beverage container. The holder is intended for installation in a means of locomotion, especially a motor vehicle. A beverage container is understood to be, for example, a beverage can, a beaker or a cup.

Holders of that kind are known in a multiplicity of different forms. Known holders have an insertion opening, in which the beverage container can be inserted. For the purpose of matching different diameters of beverage containers, compensating flaps are known, which are pivotally arranged at an edge of the insertion opening and are urged into the insertion opening under spring loading. When it is inserted, the beverage container pushes the compensating flap to the side to an extent that corresponds to its diameter.

SUMMARY OF THE INVENTION

The invention is based on the problem of proposing a holder for a beverage container, wherein the size of the insertion opening can be set.

In keeping with these objects and with others which will become apparent hereinafter, one feature of the present invention resides, briefly stated, in a holder for a beverage container, comprising two holding arms which engage around an insertion opening for the beverage container and are mounted so that they are pivotable in a lateral direction about pivot axes as pincers; and adjuster provided for a size of the insertion opening and contacting said holding arms at points spaced away from said pivot axes and also keeping constant a spacing of said holding arms from one another at the contact points, said adjuster having an adjustable spacing from the pivot axes of said holding arms.

The holder according to the invention has two holding arms, which may be, for example crescent-shaped and which engage laterally around an insertion opening for the beverage container, in this arrangement, it is not necessary to engage around a full circumference of the insertion opening; it is sufficient for the holding arms so to engage around an inserted beverage container that it is held between the holding arms securely and prevented from tipping. The holding arms mounted about pivot axes in the manner of pincers; they can pivot in a lateral direction. The phrase 'can pivot in a lateral direction' means that the size of the insertion opening, in particular its diameter changes when the holding arms are pivoted. The two holding arms can also have a common pivot axis. In accordance with the invention, the holder has an adjuster for the size of the insertion opening.

The adjuster contacts the holding arms at points spaced away from the pivot axes of the holding arms; it keeps constant the spacing of the holding arms from one another at the contact points. The contact points are the points at which the adjuster contacts the holding arms. The spacing of the adjuster from the pivot axes of the holding arms can be set, for example, by moving the adjuster. Changing the spacing of the adjuster, which adjuster holds the holding arms at the contact points at a constant spacing from one another, pivots the holding arms apart or together, in the manner of pincer jaws. Pivoting the holding arms modifies and sets the size of the insertion opening.

The invention has the advantage that the size of the insertion opening can be matched to a beverage container being inserted, a large size adjustment range being possible. A further advantage is that cups with handles can be inserted into the holder according to the invention when the holding arms do not completely surround the insertion opening.

The adjuster can, for example, contact edges of the holding arms in the manner of a clamp, or can, for example, engages in grooves, slots, slideways or the like in the holding arms by means of pins, sliding blocks or the like, in order to keep constant the spacing of the holding arms from one another at the contact points. In an embodiment of the invention there are provided on the holding arms two control surfaces, which face one another and the spacing between which changes in the direction of the pivot axes, for example in a wedge shape. The adjuster is arranged between the control surfaces. A spring element urges the control surfaces of the holding arms against the adjuster. When the adjuster is moved in the longitudinal direction of the gap between the control surfaces, the adjuster pivots the holding arms in contact with it and, as a result, modifies the size of the insertion opening.

When the spring element(s) subject(s) the holding arms to an inwardly directed force, that is to say in the direction of a smaller insertion opening, it is advantageous that the insertion opening can be set slightly smaller than the beverage container to be inserted. On insertion, the beverage container presses the holding arms slightly further apart against the force of the spring element and is held biased in the insertion opening between the holding arms. In principle, it is also possible for the principle to be reversed so that the spring element subjects the holding arms to an outwardly directed force and the holding arms are held by the adjuster so that they do not pivot out.

In an embodiment of the invention, for the purpose of matching to beverage containers of different heights, the holding arms are provided with height adjustment. In an embodiment of the invention, the height adjustment is achieved by means of the fact that the holding arms can be pivoted about a horizontal pivot axis.

The invention is described below in greater detail with reference to an exemplary embodiment illustrated in the drawing.

BRIEF DESCRIPTION OF THE DRAWINGS

FIGS. 3–5 show the holder of FIG. 1 in various positions together with beverage containers of different sizes.

DESCRIPTION OF THE PREFERRED EMBODIMENTS

Figure 1:
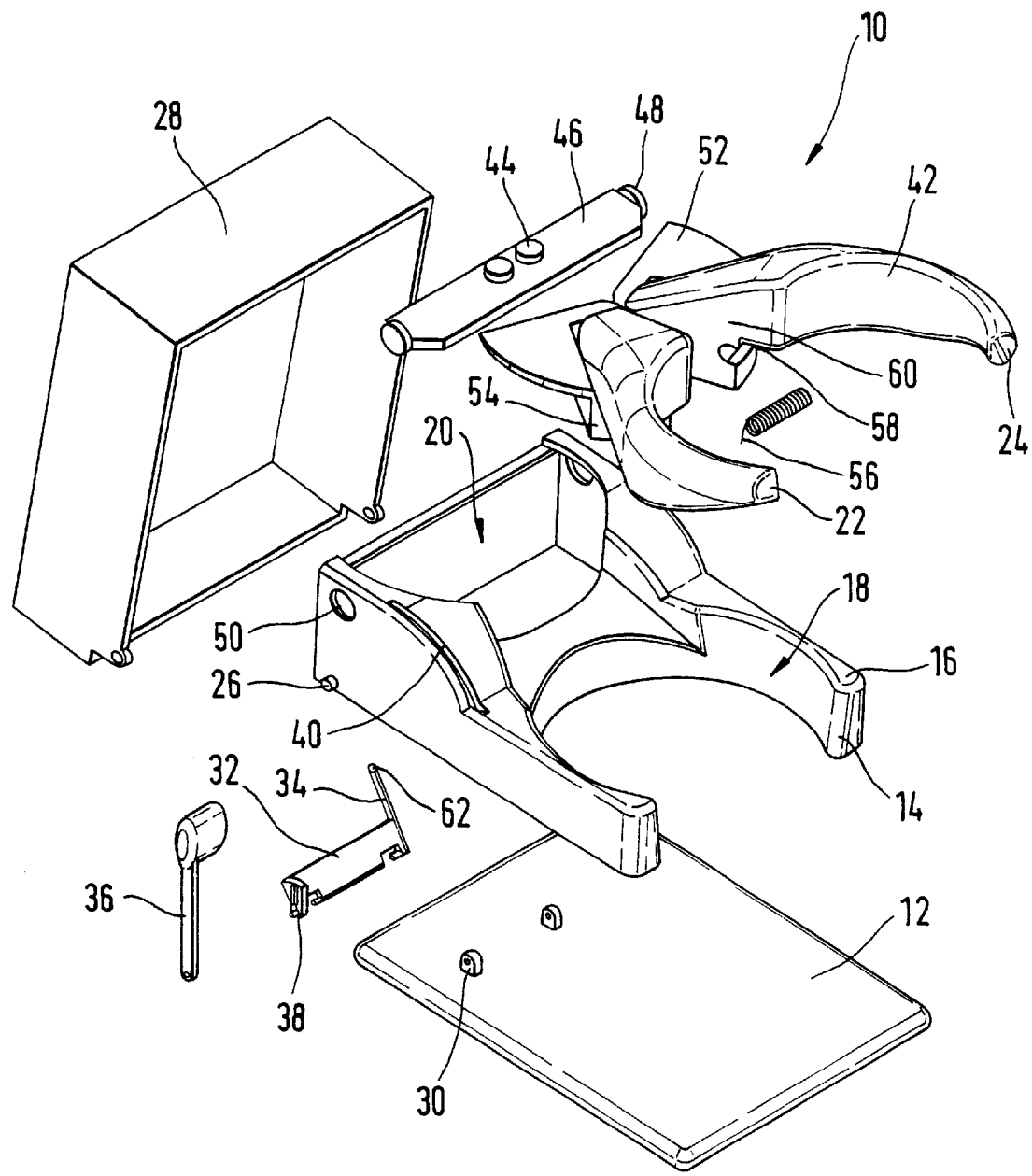
FIG. 1 is an exploded view of component parts of a holder according to the invention.
Figure 2:
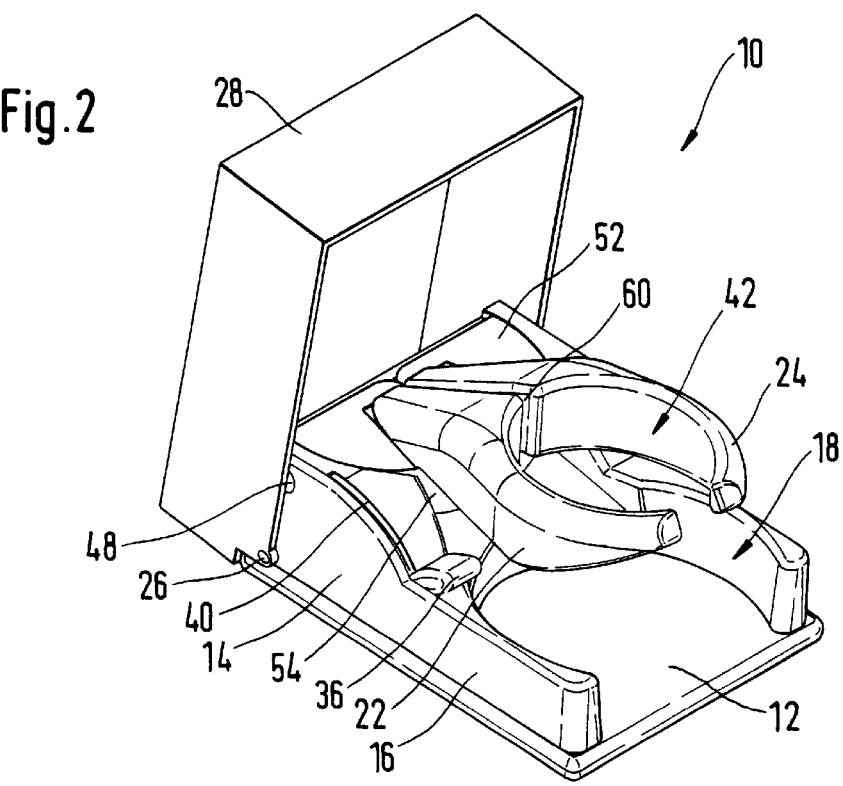
FIG. 2 shows the holder of FIG. 1 in an assembled state.

The holder 10 according to the invention shown in FIGS. 1 and 2, for a beverage container, for example a beverage can, a beaker or a cup, is intended for installation in a motor vehicle (not shown) or any other means of locomotion. The holder 10 has a baseplate 12, which is rectangular in plan view and on which a base part 14 is fixedly mounted. When the holder 10 is assembled, the base part 14 is fixed and preferably unreleasably connected to the baseplate 12, for example by adhesion or by plastics welding. The base part 14 has two rigid arms 16 surrounding a free circular space between them, which space forms the lower portion of an insertion opening 18 of the holder 10. The arms 16 surround the insertion opening 18 over approximately three quarters of a circle.

To the side of the insertion opening 18, the base part 14 has a recess 20 for two holding arms 22, 24. The recess 20 is open to the top and open to the insertion opening 18.

A drawer-like flap cover 28 of the holder 10 is pivotally mounted on laterally projecting pins 26.

Arranged on the upper face of the baseplate 12 are two mounting blocks 30, in which an adjuster 32 is pivotally mounted. The adjuster 32 has a ball-headed pin 34 pointing upwards from the baseplate 12. An operating lever 36 is connected to the adjuster 32, for conjoint rotation therewith, by way of a radial lip 38. The adjuster 32 and the operating lever 36 are of two parts for assembly reasons; in principle, they can also be integral with one another. The operating lever 36 projects up out of the base part 14 through a slot 40 on one side. When the holder 10 is assembled, the adjuster 32 is located beneath the base part 14 and the holding arms 22, 24.

The two holding arms 22, 24 are crescent-shaped in plan view and are a mirror image of one another; they engage around the upper portion of the insertion opening 42 of the holder 10. Each of the two holding arms 22, 24 engages around the insertion opening 42 at locations opposite one another, in each case for slightly less than an arc of half of a circle. The upper portion of the insertion opening 42, which the holding arms 22, 24 engage around, is located on approximately the same axis as, and above, the lower portion of the insertion opening 18, which is surrounded by the rigid arms 16 of the base part 14.

The holding arms 22, 24 are pivotally mounted on two pins 44 arranged next to one another on a crossbar 46, spaced away from the insertion opening 42. The holding arms 22, 24 can pivot outwards and inwards in a lateral direction about pivot axes defined by the pins 44; they can pivot in the manner of pincer jaws. Pivoting of the holding arms 22, 24 outwards make the insertion opening 42 they engage around larger; pivoting inwards makes it smaller. The size of the insertion opening 42 which the holding arms 22, 24 engage around is accordingly adjustable by pivoting the holding arms 22, 24.

At its ends, the crossbar 46 has mounting pins 48, which, when the holding 10 is assembled are rotatably accommodated in mounting holes 50 in the sides of the base part 14. The crossbar 46 can, as a result, pivot about a horizontal pivot axis; the height of the holding arms 22, 24, which are so mounted on the crossbar 46 that they can pivot laterally, can be adjusted by pivoting the crossbar 46, that is to say the spacing of the holding arms 22, 24 from the baseplate 12 is adjustable. The mounting pins 48 of the crossbar 46 are accommodated in the mounting holes 50 of the base part 14 with a gripping fit so that the holding arms 22, 24 maintain the particular height at which they are set.

In a region of the holding arms 22, 24 facing the crossbar 46, they are provided with covers 52, which project out to the sides in the manner of wings and have circular outside edges, and with cylindrically rounded panels 54 projecting downwards. The covers 52 and the panels 54 are integral with the holding arms 22, 24 and, when the holder 10 is assembled, they cover the recess 20 in the base part 14 to the top and to the side in the direction of the insertion opening 18 (FIG. 2).

The holder 10 has a spring element 56, which in the illustrated and described exemplary embodiment of the invention is in the form of a helical tension spring, which is hooked into insertion holes 58 in the holding arms 22, 24. The spring 56 subjects the holding arms 22, 24 to spring loading in an inwards direction.

The holding arms 22, 24 have, laterally adjacent to the insertion opening 42 in an outwards direction, control surfaces 60 facing one another and extending in the direction of the crossbar 46 and consequently in the direction of the pivot axes of the holding arms 22, 24 defined by the pins 44 of the crossbar 46. The space between the control surfaces 60 becomes narrower in the direction of the pivot axes so that the control surfaces 60 bound a wedge-shaped gap between them. When the holder 10 is assembled, a ball head 62 arranged at the end of the ball-headed pin 34 of the adjuster 32 is located between the control surfaces 60 of the holding arms 22, 24. The spring element 56 pushes or pulls the control surfaces 60 of the two holding arms 22, 24 against the ball head 62.

Pivoting the adjuster 32 by means of the operating lever 36 moves the ball head 62 on a course in the shape of an arc of a circle in the longitudinal direction of the wedge-shaped gap between the control surfaces 60 so that its spacing from the pivot axes of the holding arms 22, 24 defined by the pins 44 changes. The ball head 62 keeps constant the spacing of the holding arms 22, 24 at the contact points, that is to say the points where the control surfaces 60 contact the ball head 62. Moving the ball head 62 in the direction of the pins 44, that is to say in the direction of the narrowing wedge-shaped gap between the control surfaces 60, pivots the holding arms 22, 24 out from one another. When the ball head 62 is moved in the opposite direction, the holding arms 22, 24 are pivoted in an inwards direction as a result of the force of the spring element 56. The size of the insertion opening 42 which the holding arms 22, 24 engage around can consequently be set by moving the ball head 62 in the longitudinal direction of the wedge-shaped gap between the control surfaces 60.

Figure 3:
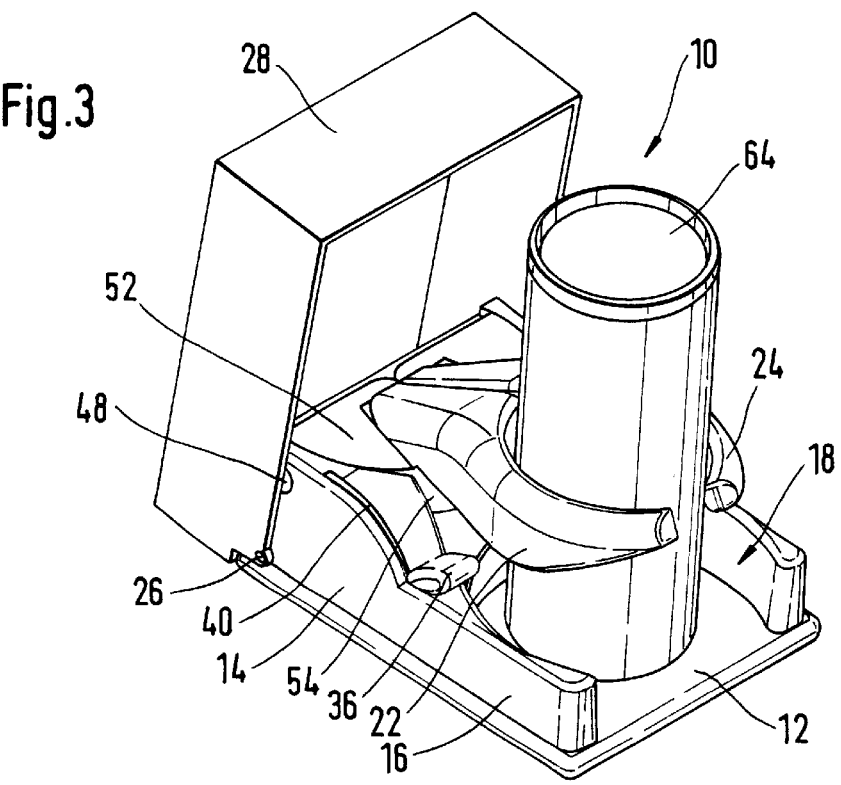
Figure 4:
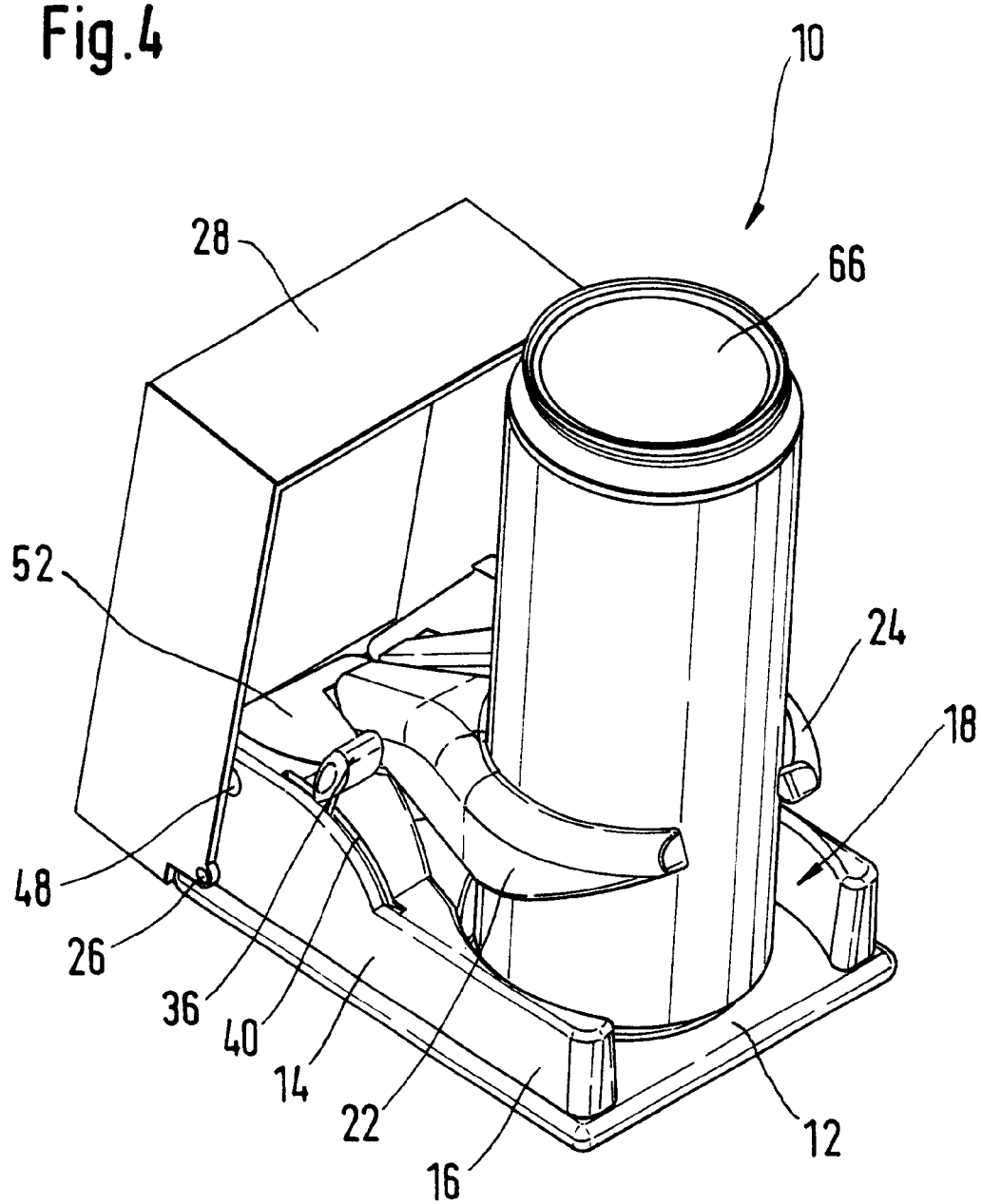

The ball head 62 is moved by pivoting the adjuster 32 using the operating lever 36. By adjusting the size of the insertion opening 42 between the holding arms 22, 24, the holder 10 according to the invention can be matched to beverage containers of different diameters, as shown in FIGS. 3, 4, and 5, wherein two beverage cans 64, 66 of different diameters (FIGS. 3, 4) and a beaker 68 (FIG. 5) of larger diameter are inserted into the holder 10 and the size of the insertion opening 42 between the holding arms 22, 24 is matched to the beverage containers 64, 66, 68 in question. By pivoting the holding arms 22, 24 upwards or downwards about the horizontal pivot axis defined by the mounting pins 48 of the crossbar 46, the insertion height at which the holding arms 22, 24 engage around the inserted beverage containers 64, 66, 68 can be matched to the height of the beverage containers 64, 66, 68.

It will be understood that each of the elements described above, or two or more together, may also find a useful application in other types of constructions differing from the types described above.

While the invention has been illustrated and described as embodied in a holder for a beverage container, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A holder for a beverage container, comprising two holding arms which engage around an insertion opening for the beverage container and are mounted so that they are pivotable in a lateral direction about pivot axes as pincers; and an adjuster provided for a size of the insertion opening and contacting said holding arms at points spaced away from said pivot axes and also keeping constant a spacing of said holding arms from one another at the contact points, said adjuster having an adjustable spacing from the pivot axes of said holding arms, said holding arms having two control surfaces which face one another and a spacing between said control surfaces changes in a direction of said pivot axes of sail holding arms, said adjuster being arranged between said two control surfaces of said holding arms; and at least one spring element which urges said control surfaces of said holding arms against said adjuster.

2. A holder as defined in claim 1, wherein said spring element is arranged so that its subjects said holding arms to an inwardly directed force.

3. A holder for a beverage container, comprising two holding arms which engage around an insertion opening for the beverage container and are mounted so that they are pivotable in a lateral direction about pivot axes as pincers; and an adjuster provided for a size of the insertion opening and contacting said holding arms at points spaced away from said pivot axes and also keeping constant a spacing of said holding arms from one another at the contact points, said adjuster having an adjustable spacing from the pivot axes of said holding arms, wherein said holding arms have height adjustment means.

4. A holder as defined in claim 3, wherein said holding arms are mounted so that they are pivotable about a horizontal pivot axis.

* * * * *